Nov. 27, 1945.　　　L. V. VILLANI　　　2,389,704
UNIVERSAL AUTOMOTIVE VEHICLE WINDSHIELD DEFROSTER AND DRIER
Filed Oct. 29, 1942　　　2 Sheets-Sheet 1
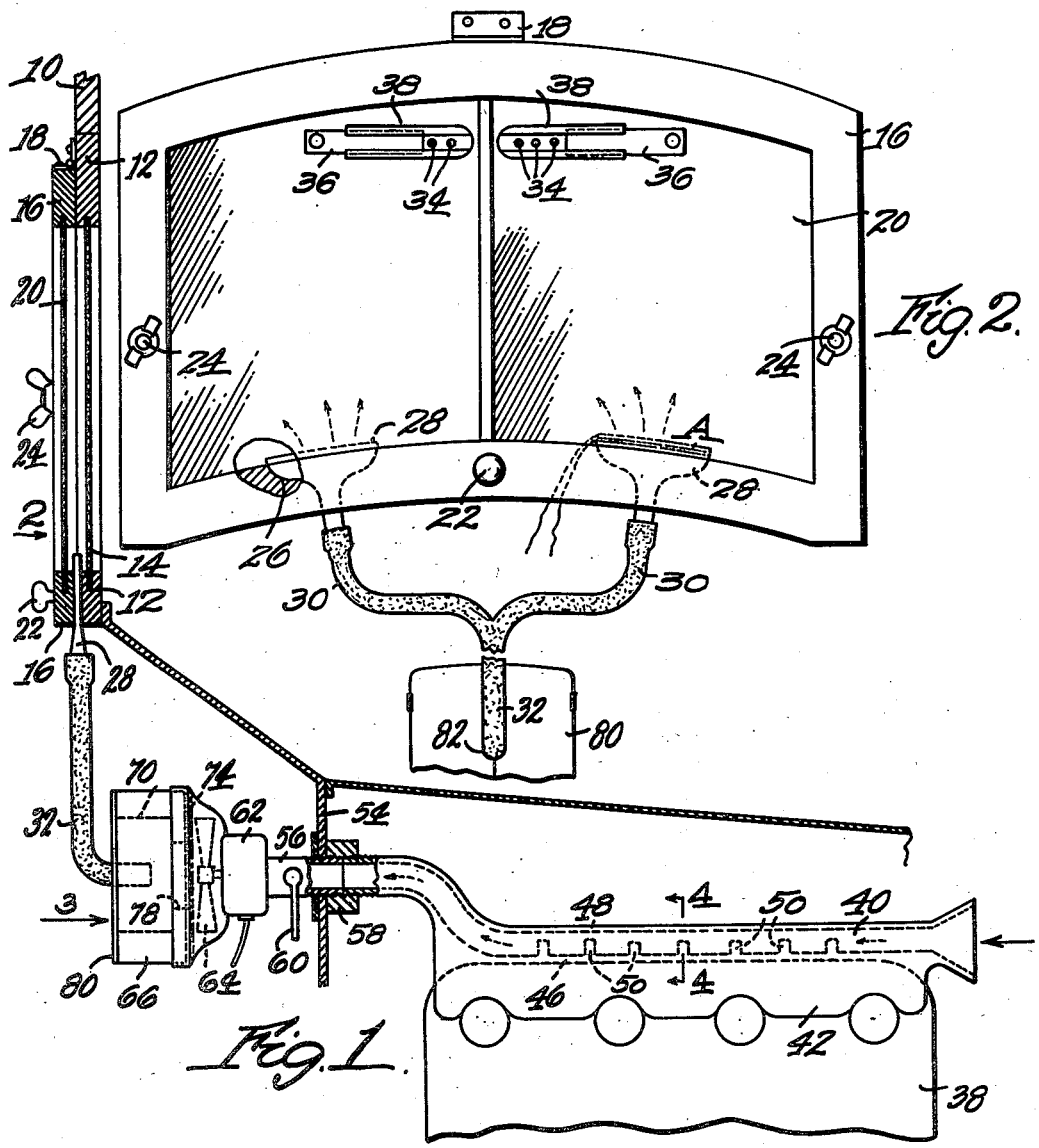
Inventor.
Lazzaro V. Villani

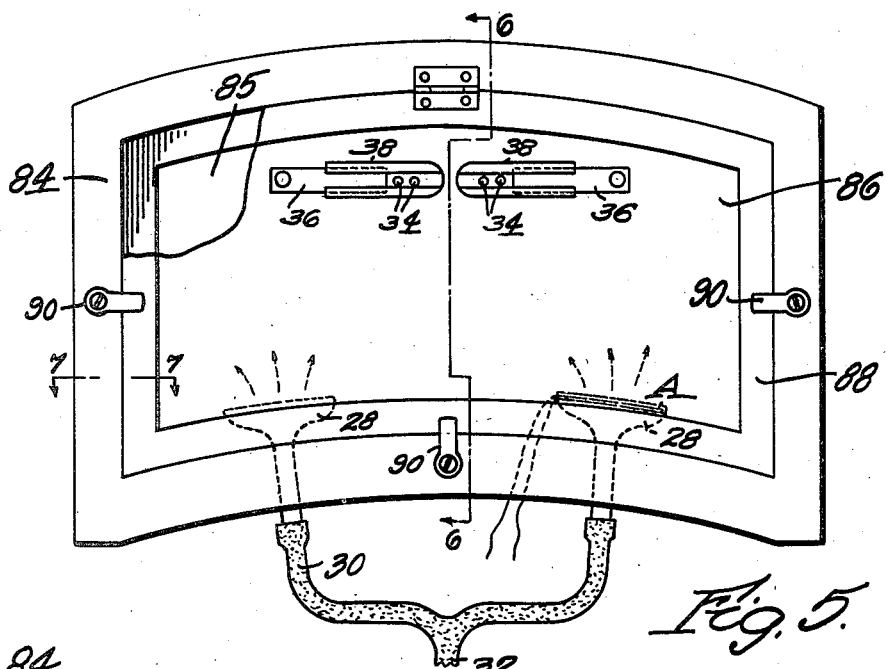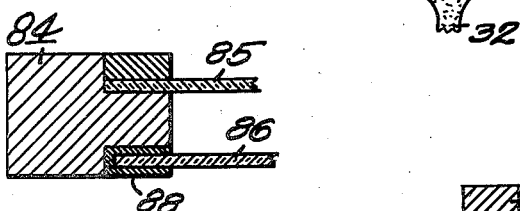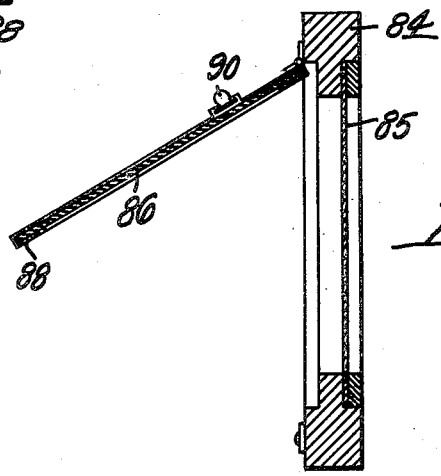

Patented Nov. 27, 1945

2,389,704

UNITED STATES PATENT OFFICE 2,389,704

UNIVERSAL AUTOMOTIVE VEHICLE WINDSHIELD DEFROSTER AND DRIER

Lazzaro V. Villani, Milford, Mass.

Application October 29, 1942, Serial No. 463,742

3 Claims. (Cl. 20—40.5)

This invention relates to vehicle appliances and more particularly to a novel windshield and heating, defrosting, and drying means for said vehicle and windshield.

Objects of the invention include the provision of a double windshield having means applied thereto for admitting heated air between the two panes of glass which comprise the double windshield, together with means providing for opening one of the said panes and means for detachably mounting or removing the heating means; the provision of a universal automotive vehicle windshield defroster and drier comprising a double window having a heated-air entrance at the lower part of and between the glass elements of the double windshield, together with adjustable means for permitting the air to escape from between the windshield elements, and means pivotally mounting one windshield element relative to the other.

Other objects and advantages of the invention will appear hereinafter.

Reference is to be had to the drawings in which

Fig. 1 is a view in elevation of a preferred embodiment of the invention, parts being in section;

Fig. 2 is a view in elevation of one form of the double windshield looking in the direction of arrow 2 in Fig. 1;

Fig. 3 is an enlarged view in elevation of the heat accumulator, looking in the direction of arrow 3 in Fig. 1;

Fig. 4 is an enlarged section on line 4—4 of Fig. 1;

Fig. 5 is a view in elevation of a modified form of said windshield;

Fig. 6 is a sectional view of the windshield on the line 6—6 of Fig. 5 showing the inner frame open; and Fig. 7 is a section on line 7—7 of Fig. 5.

In the drawings reference numeral 10 indicates the conventional vehicle body on which my invention is to be mounted. As shown in Fig. 1 a window frame 12 is mounted as for instance in the usual manner in body 10. Frame 12 is adapted to hold a glass windshield 14. I provide an auxiliary window frame 16 at the interior side of frame 10, and frame 16 may be pivoted to frame 12 as by a hinge 18, so that frame 16 may be pivoted, from frame 12, to open up the space between window 14 and window 20, the latter being mounted in frame 16. A knob 22 is provided at the bottom of frame 16 to act as a hand hold in opening and closing the interior window 20, and a screw 24 is mounted in each of the end members of the frames, each screw being provided with a wing nut for clamping the pivoted frame 16 to stationary frame 12 in air tight condition.

In the lower frame elements of the window frames, there are provided a pair of shallow, relatively long fan shaped recesses 26 for the purpose of receiving and retaining a pair of narrow similarly shaped nozzles 28. These nozzles are connected in an obvious manner with the ends 30 of a branched pipe 32. The purpose of the branched pipe and the nozzles is to transmit heated air from any convenient source into a space defined by the two windows. Since the screws 24 will hold the frame elements 16 and 12 in close contacting condition, a warm air pocket is formed between windshields 14 and 20, the long, narrow shape of nozzles 28 providing for the dispersion or flow of the heated air over the complete area of both of the windows. A felt strip or the like may be used if desired as a gasket between the window frames. Air vents are formed by a series of apertures 34 of any desired number, located at the top of the pivotal window 20. These exit apertures may be opened or closed by valve strips 36 working in guide ways 38.

The above described construction provides for an efficient windshield defroster and drier, in which the heated air will always clear the windshield of fog, sleet and ice, as the heat is held in intimate contact with the outer windshield 14 by reason of the double windshield construction as provided by inner windshield 20. Any desired degree of heat may be obtained by manipulation of the strips 36 to vary the degree of facility of exit of the air between the two windshields. Clearly the more apertures 34 there are uncovered, the more heated air will enter the interior of the vehicle to warm it, and the faster will the heated air escape from between the windshields.

The motor of the vehicle is conventionally represented at 38, it being understood that the usual motor fan will be present to drive incoming air to the rear. I have provided a novel casing unit 40 to be clamped in close contact with the exhaust manifold of the motor. This casing unit comprises a side wall 42 shaped to conform to the manifold. This side wall is double as shown in Fig. 4 and its interior wall 44 rises to merge into a closed bottom wall 46 of the casing unit. The outer wall of side 42 rises to form a roof 48 for the casing, this roof providing the outer aspect of the casing and extending along an arc to merge into the bottom wall 46. A series of elbow-like pipes 50 are formed in the bottom wall 46 and provide air passages for heat from the manifold so that pipes 50 extend in enclosed form into the interior of casing 40 in order to more efficiently heat the air which flows through the casing as indicated by the arrows in Fig. 1. Casing unit 40 is provided with a funnel-like air intake enlargement at its forward end, and at its rear end it is directed to the rear to pass through the motor partition 54 to be connected to a short pipe 56 at the other side of the partition. Pipe 56 is connected to partition 54 and housing unit 40 by means of a screw clamp device 58, and pipe 56 is provided with a valve having a handle 60 for cutting off the flow of air when heat is not desired in the interior of the vehicle or for selectively admitting air to defrost or dry the windshield. It will be seen that no leakage of noxious gases from the manifold can enter the casing as the latter is completely closed therefrom.

Pipe 56 is enlarged at 62 to accommodate a motor for driving a fan 64, this fan assisting the flow of air. The numeral 66 indicates a heat accumulator which comprises a corrugated ribbon metal strip 68 which is arranged in a circle with the corrugations radial as shown in Fig. 3 and this strip is located in a housing 70. U-shaped metal strips 72 are mounted between the convolutions of the ribbon element 68 to aid in the function of the heat accumulator, and a partition 74 which is in front of the fan is apertured at 76 to allow for transmission of the heated air. Partition 74 is provided with an enlarged central aperture 78 through which the largest air flow occurs, and it will be noted that as the ribbon-like element 68 is formed in a circle, its center is free to conform in shape to aperture 78, as shown in Fig. 3. A pair of doors 80 are hinged to the casing 66 and these doors are provided with indentations 82 of the size of the end of the pipe 32, which just fits into and is held in and by the interior ends of the convolutions of the ribbon-like element 68. With the pipe in position as shown in Fig. 1, and with doors 80 closed, it will be seen that the safe maximum heat possible to be derived from the exhaust manifold is obtained in an efficient manner by means of the above described construction. If doors 80 are opened, a lesser but normally sufficient amount of heat is directed to the windshield, but more heat is directly forced into the vehicle, and thus a very simple control is provided for this purpose.

In Figs. 5, 6, and 7 I disclose a modified form of windshield construction wherein the outer windshield frame 84 and its glass 85 are substantially the same as frame 12 and windshield 14, but the inner pivoted windshield 86 is made without the heavy frame 16, but instead is provided with a thin peripheral strip 88. This construction allows for the nesting of the inner windshield frame in the outer frame as shown in Fig. 7 and thus presents a neater appearance and takes up less room. The inner frame may be latched as by rotary latches 90 to the outer frame.

Either or both of the nozzles 28 may be provided with an electric resistance unit A which may extend from end to end of the narrow nozzles and may be either single or double as shown. This unit will provide additional heated air, or may be used by itself with the heated air from the motor absent.

Any modification may be made in my invention without departing from the scope of the appended claims. The invention may be applied to any kind of a vehicle having a motor, to trucks, busses, autos and other vehicles and the shapes and dimensions of the various parts may be greatly changed from those shown while still being contemplated as coming within the spirit of the invention.

Having thus described my invention and the advantages thereof, I do not wish to be limited to the details herein disclosed, otherwise than as set forth in the claims, but what I claim is:

1. In a device of the class described, a windshield defrosting and drying device comprising a windshield frame, a second windshield frame pivoted to the first windshield frame for pivotal movement to and from the same, at least one of said windshield frames having a shallow, fan-shaped recess facing the other windshield frame, and a shallow, fan-shaped air nozzle fitting said recess and adapted to be removably clamped by and between said windshield frames.

2. A windshield defroster and drier comprising a pair of windshields for mounting in a vehicle, one being fixed and the other movable, means providing for movement of one windshield to and away from the other windshield which is fixed, clamping means to clamp the windshields in contacting parallel condition to form an air pocket therebetween, the fixed windshield having a fan shaped recess formed therein adjacent an edge thereof, and a fan-shaped inlet nozzle detachably mounted in said recess.

3. A windshield defroster and drier comprising two pivoted frames, a pane of transparent material in each frame, means for clamping said frames together in contacting parallel condition to form an air pocket between the panes, a fan-shaped recess adjacent an edge of at least one frame, said recess facing the other frame to be covered thereby when the frames are clamped together, and a fan-shaped air inlet nozzle adapted to be clamped between the frames and fitting the recess.

LAZZARO V. VILLANI.